Figure 7:
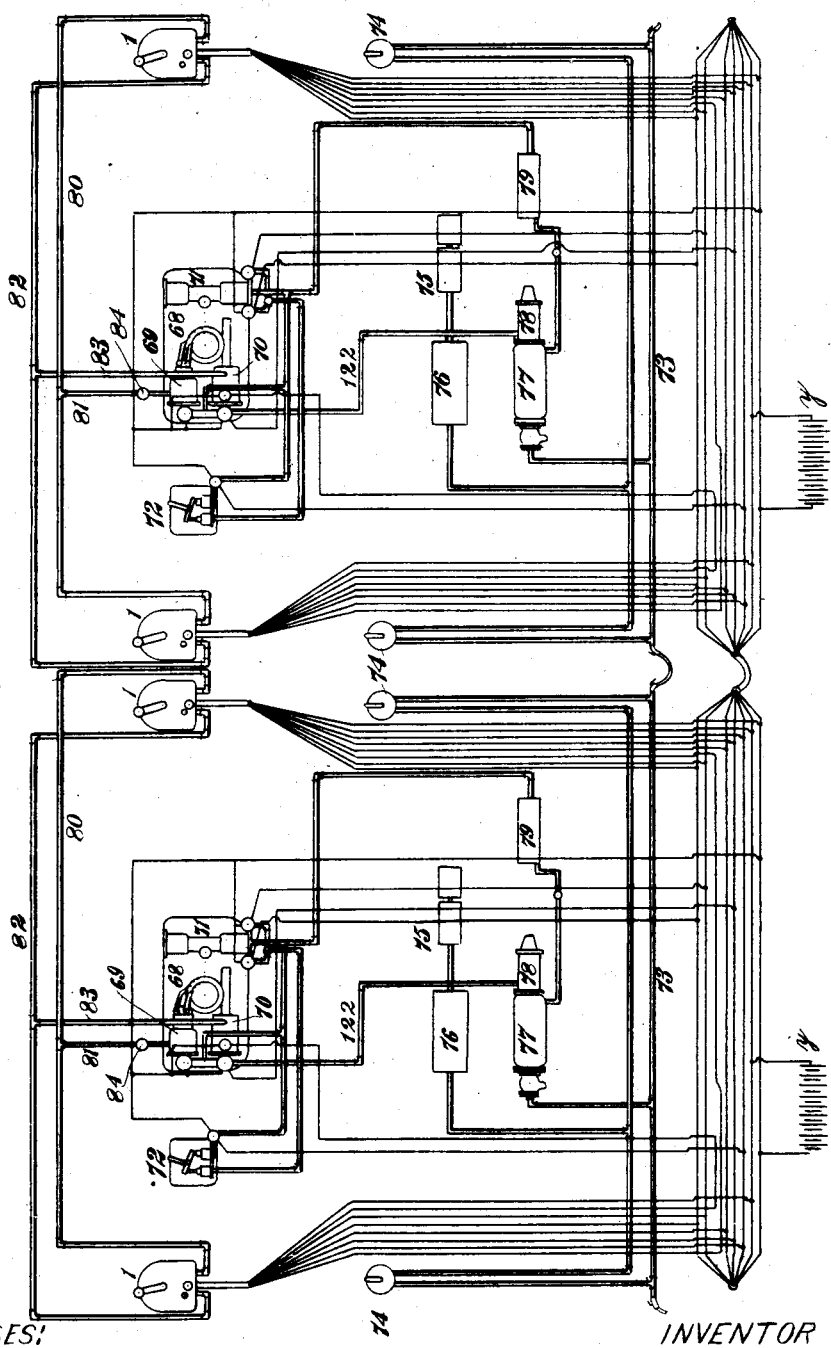

No. 682,828. Patented Sept. 17, 1901.
E. R. HILL.
ELECTROPNEUMATIC CONTROLLING SYSTEM.
(Application filed Jan. 13, 1900.)
(No Model.) 6 Sheets—Sheet 1.

WITNESSES

INVENTOR
Ernest R. Hill
BY Wiley C. Carr
ATTORNEY

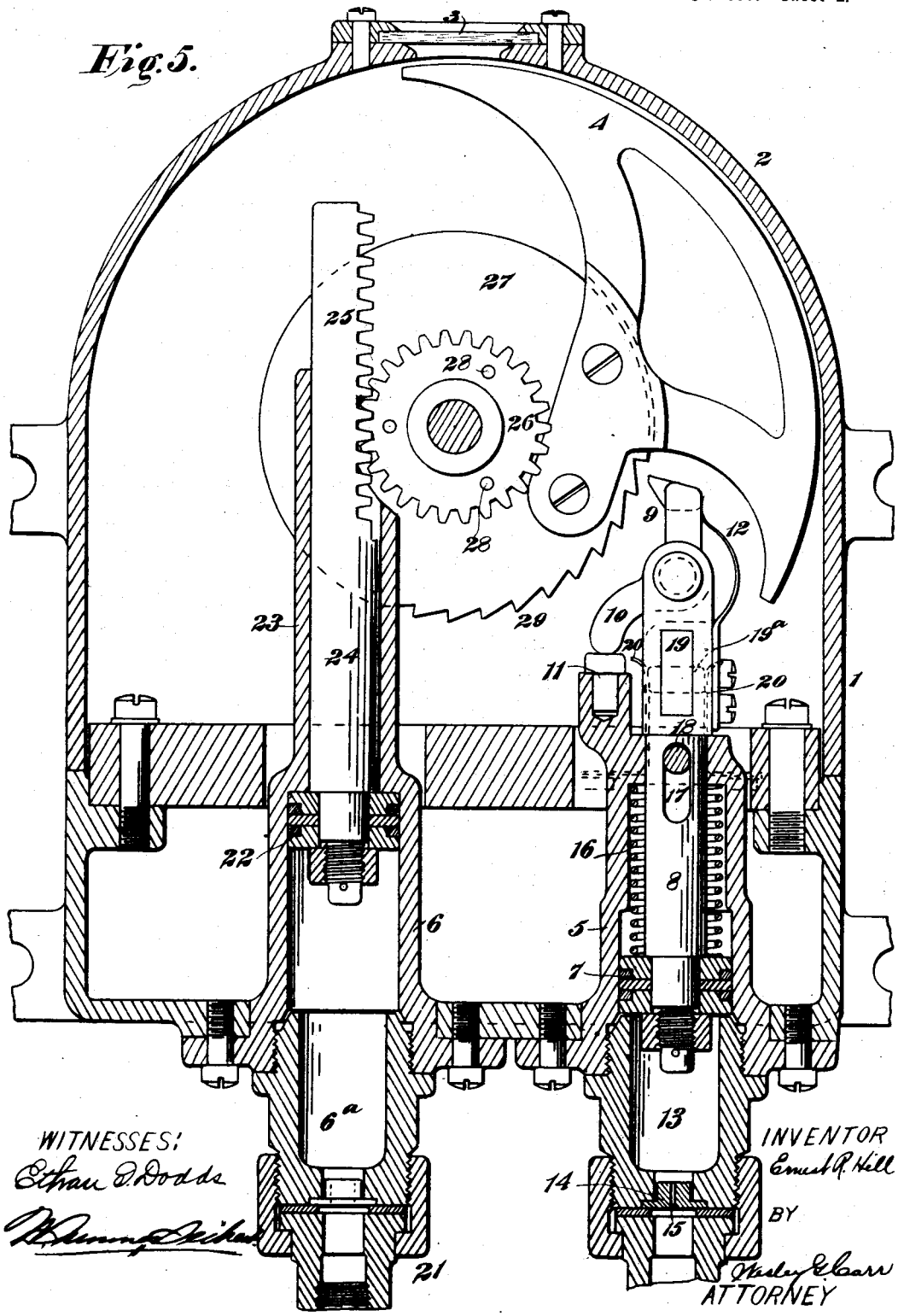

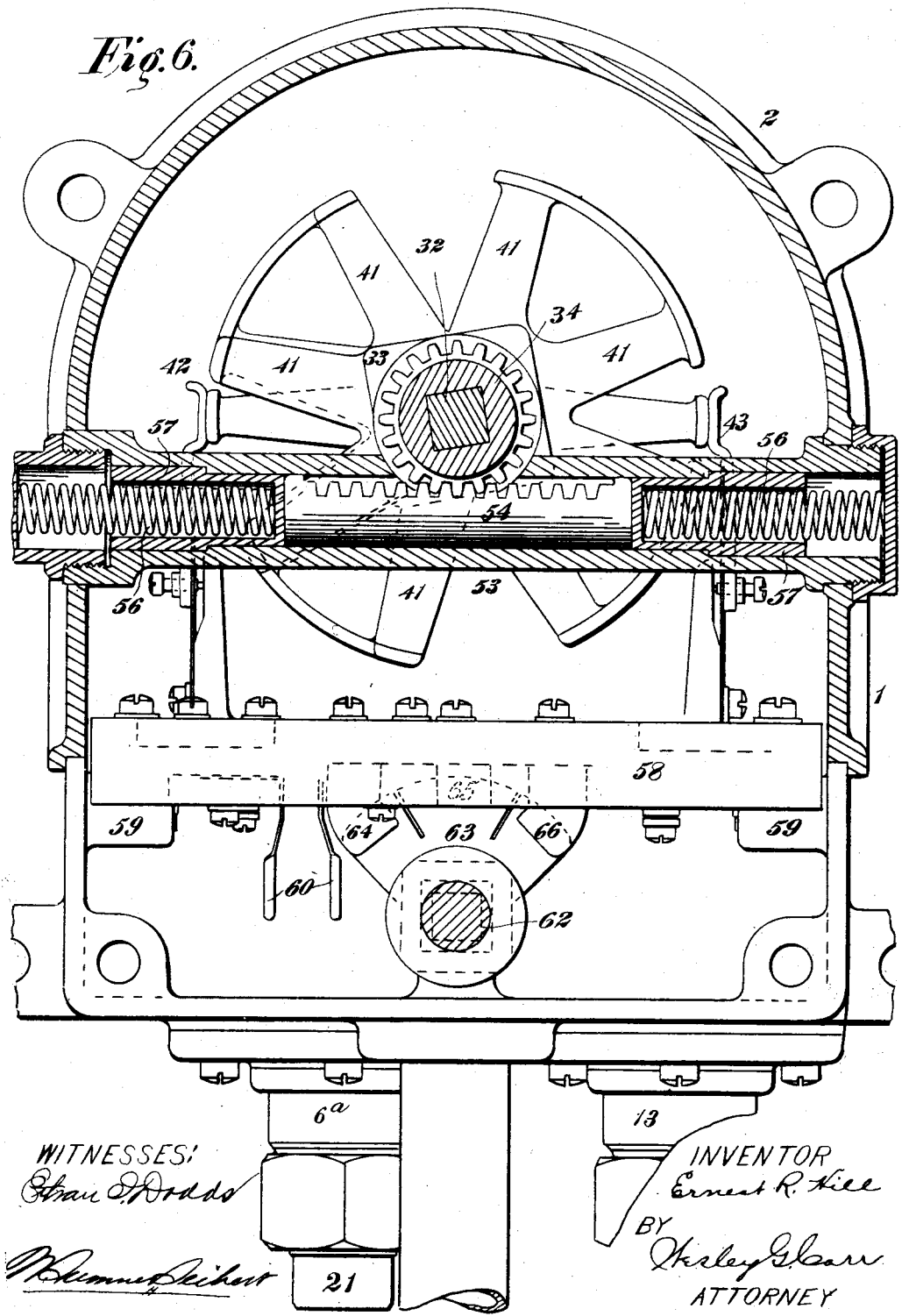

No. 682,828. Patented Sept. 17, 1901.
E. R. HILL.
ELECTROPNEUMATIC CONTROLLING SYSTEM.
(Application filed Jan. 13, 1900.)
(No Model.) 6 Sheets—Sheet 4.

WITNESSES:
INVENTOR
Ernest R. Hill
BY
Wesley G. Carr
ATTORNEY

No. 682,828. Patented Sept. 17, 1901.
E. R. HILL.
ELECTROPNEUMATIC CONTROLLING SYSTEM.
(Application filed Jan. 13, 1900.)
(No Model.) 6 Sheets—Sheet 5.
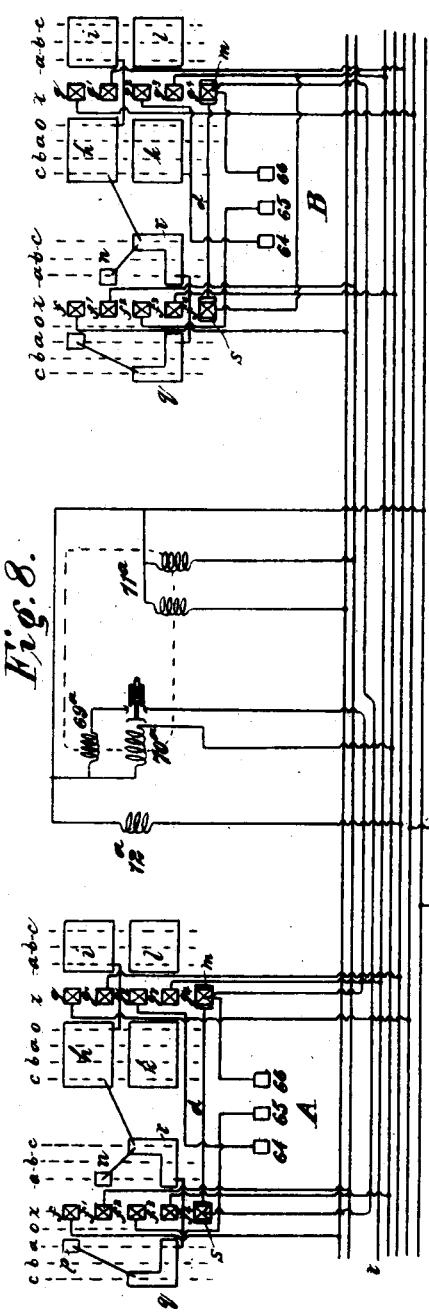
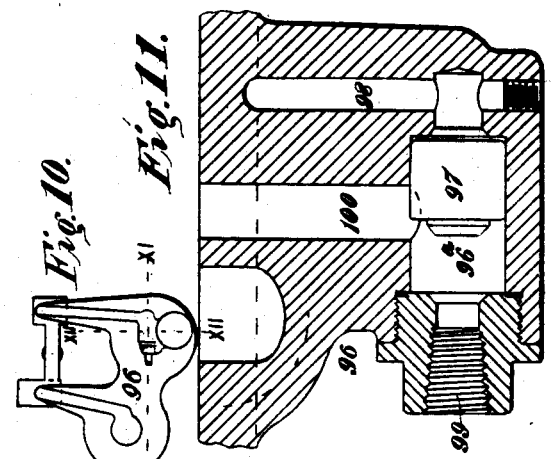
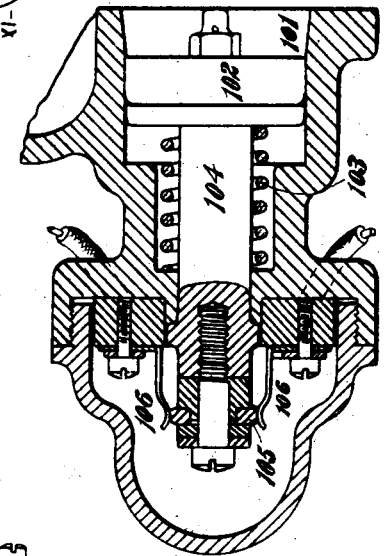
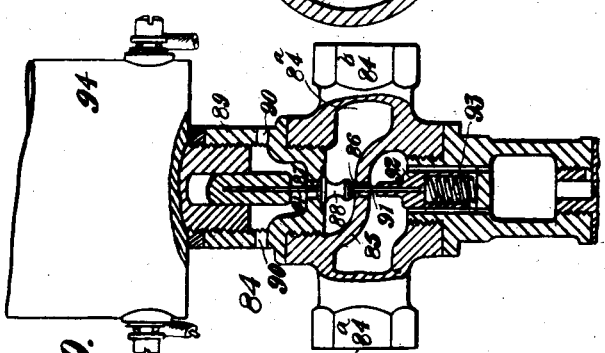
WITNESSES:
INVENTOR
Ernest R. Hill
BY
ATTORNEY

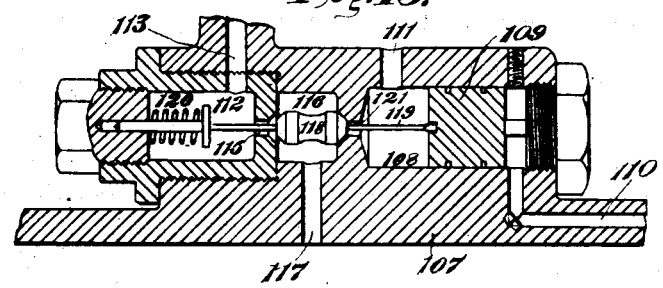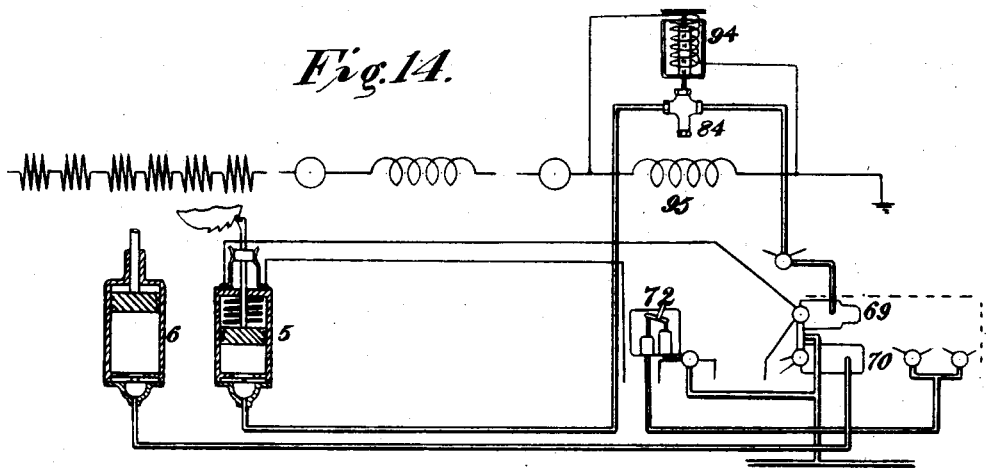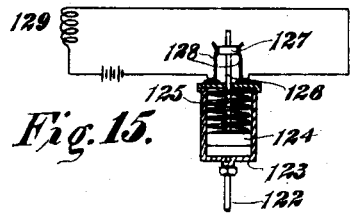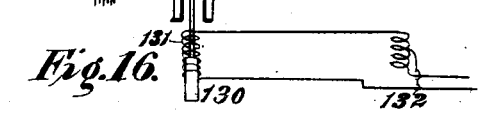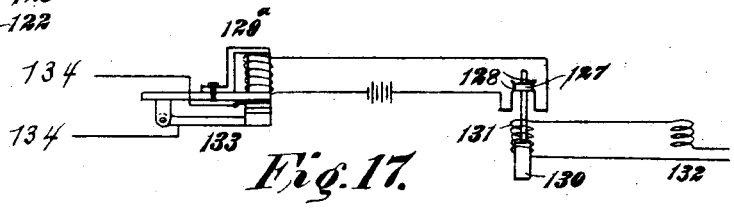

ered here and there throughout its length the cars must all be together to ensure uninterrupted service.

UNITED STATES PATENT OFFICE.

ERNEST R. HILL, OF WILKINSBURG, PENNSYLVANIA.

ELECTROPNEUMATIC CONTROLLING SYSTEM.

SPECIFICATION forming part of Letters Patent No. 682,828, dated September 17, 1901.

Application filed January 13, 1900. Serial No. 1,374. (No model.)

*To all whom it may concern:*

Be it known that I, ERNEST R. HILL, a citizen of the United States, residing at Wilkinsburg, in the county of Allegheny and State of Pennsylvania, have invented certain new and useful Improvements in Electropneumatic Controlling Systems, of which the following is a specification.

My invention relates to systems of control for electrically-propelled vehicles, and it has special reference to such systems as embody means located at any selected point on a train of cars whereby a plurality of controllers on one car or a plurality of cars may be operated in synchronism to start, stop, and vary the speed of the propelling-motors.

Specifically, my invention relates to the electropneumatic controlling system covered by Patent No. 624,277, granted to George Westinghouse May 2, 1899; and it has for its objects, first, to provide a means for insuring automatic acceleration of a car or train of cars at some predetermined rate; second, a means for so limiting the current supplied to the motor or motors that it may never exceed a definite predetermined amount; third, a new arrangement of means for operating the valves which are employed for controlling the admission of air to the releasing-cylinder of the controller and to the releasing-cylinder of the circuit-breaker whereby the pistons operating in such cylinders are actuated positively when the circuits of the magnets for their operating-valves are open or when the battery fails to work and whereby the air-pressure is maintained in the releasing-cylinders of the circuit breaker or controller, thus making it impossible for either the circuit-breaker or the controller to be moved positively during the time that the magnet-circuits are open or the battery is inoperative; fourth, a means operated either pneumatically or electropneumatically for cutting off the air-pressure from the operating-cylinder of the controller and for venting such operating-cylinder into the atmosphere whenever the releasing-cylinder of the controller is in communication with the source of compressed air; fifth, the construction and arrangement of controlling-switches whereby all the operations which properly pertain to controlling the train are made by a single handle, which is returned to the "off" or safety position automatically whenever it is released by the motorman.

With these ends in view I have devised the apparatus shown in the accompanying drawings, in which—

Figure 1 is a front elevation of one of the controlling-switches. Fig. 2 is a plan view of the same. Fig. 3 is a detail sectional view of the operating-handle for the controlling-switch. Fig. 4 is a horizontal sectional view on line IV IV of Fig. 1. Fig. 5 is a longitudinal section through the controlling-switch on a plane at right angles to that of Fig. 4. Fig. 6 is a longitudinal sectional view similar to that of Fig. 5, but in a different plane. Fig. 7 is a diagram of controlling apparatus for two cars, each of which is provided with a controlling-switch at each end and with suitable motors and controlling and regulating apparatus therefor. Fig. 8 is a diagram of the electrical circuits and connections for two controlling-switches and one controller. Fig. 9 is a view, partially in elevation and partially in section, of a valve and its operating-magnet for limiting the amount of current flowing through the motors. Fig. 10 is an end elevation, on a reduced scale, of the heads of the operating and releasing cylinders of a controller. Fig. 11 is an enlarged sectional view taken on line XI XI of Fig. 10. Fig. 12 is a sectional view of one form of safety-valve and switch construction, the section being taken on line XII XII of Fig. 10. Fig. 13 is a sectional view of a modified form of device for effecting the same result as that effected by the device shown in Fig. 12. Fig. 14 is a diagram of a portion of the electrical and pneumatic circuits of the system. Figs. 15, 16, and 17 are diagrammatic illustrations of modified forms of safety devices for automatically releasing either the controller or the circuit-breaker whenever the brakes are set.

In recent developments of electrical traction it has been found advantageous in certain cases to couple a number of cars together to form a train and to provide two or more of such cars with means for self-propulsion in lieu of propelling the entire train by means of a locomotive coupled to one end of the train. Where different cars of a train, whether located adjacent to each other or separated by one or more other cars, are provided with propelling-motors, it becomes a matter of prime importance to control the speed of all the motors, no matter how widely separated, from a single point and in such a manner that changes in circuit connections whereby changes in speed are effected shall be made synchronously throughout the entire system. A desirable means for effecting this result is set forth in the Westinghouse patent hereinbefore referred to, in which the controllers for the motors are operated step by step in synchronism through the application of air-pressure to their operating mechanism and in which the application of such air-pressure is controlled by means of electromagnetically-actuated valves, the opening and closing of the circuits of the valve-magnets being effected by means of a controlling-switch located at any convenient point and under the control of the motorman. So far as the utilization of air-pressure and electricity for operating the controllers is concerned the means employed by me may be substantially the same as that set forth in the Westinghouse patent above referred to. I have, however, devised a new form of controlling-switch and connections whereby a step-by-step movement of the controllers will be effected both synchronously and automatically. I have also provided certain safety devices which will be hereinafter described and have so modified the apparatus as regards its operative features that it is automatic in its operation to a much greater degree than the system set forth in the said Westinghouse patent.

I will first describe the controlling-switch illustrated in Figs. 1 to 6 of the drawings, since the system is largely dependent upon this element, the details of construction of which, however, may be varied from what is shown without departing from the invention as a whole.

The casing 1 of the switch is shown as having a semicylindrical upper portion 2, in the top of which is mounted a sight-plate 3, this being conveniently located to enable the motorman to observe the position of the indicator-plate 4, the construction and operation of which will be hereinafter described. Suitably mounted and supported in the bottom of the casing are two cylinders 5 and 6, the former of which is provided with a piston-head 7, having a stem 8, that projects through the top of the cylinder into the casing 1. Pivotally mounted in the top of the stem 8 is a pawl 9, having a laterally-extending arm 10, adapted to engage with the head of a bolt 11 or other projection when the piston-head and stem are in the position indicated in Fig. 5. The piston-stem is also provided with a spring 12, the free end of which bears upon the upper end of the pawl, and thus serves to throw such end forward when the piston and its stem are raised, so as to permit of such movement. The cylinder 5 is extended below the bottom of the casing and below the limit of the path of movement of the piston, and in the lower end of this extension 13 is mounted a diaphragm 14, having an opening 15 therethrough, the size of which determines the rate of acceleration of the train under control, as will be hereinafter more fully described. The stem 8 is surrounded within the cylinder 5 by a coiled spring 16, the lower end of which bears against the lower end of the piston 7 and the upper end of which engages with the upper end of the cylinder. The stem 8 of the piston 7 is also provided with an elongated slot 17, into which projects a pin 18, this construction permitting the necessary longitudinal movement of the stem and piston, but preventing any movement of rotation of the said parts. The reverse arrangement of these parts may obviously be employed, if desired. The stem 8 is also provided with a non-conducting bar 19, having a conducting-pin 19$^a$, which is movable, respectively, into and out of engagement with two stationary spring contact-terminals 20 as the piston is depressed by the spring 16 and moved upward by air-pressure. The other cylinder 6 is of similar form and is mounted in substantially the same manner in the bottom of the casing 1. It also has an extension 6$^a$, provided with pipe connections 21. The piston 22 in cylinder 6 has a materially longer stroke than the piston 7 in the other cylinder, and the cylinder 6 is provided with an extension 23, which serves as a guide for the piston-stem 24. The upper portion of the stem 24 is provided with a rack 25 for engagement with a pinion 26, the latter being rigidly fastened to a disk 27 by means of pins 28 or otherwise. The disk 27 is provided with a series of ratchet-teeth 29, the number of which is equal to the number of steps in the forward movement of the controllers. These teeth are so located on the edge of the disk as to be engaged by the pawl 9 on the stem 8 when moved upward by air-pressure in the cylinder 5. To one face of the disk 27 may be fastened a segmental indicator-plate 4, the outer edge of which conforms to the semicylindrical inner surface of the top portion 2 of the casing 1, and is provided with numerals or other characters (not shown) so placed that they will be successively moved in front of the sight-opening in the casing as the disk is rotated tooth by tooth, the degree of rotation of the controller-drums being thus indicated to the motorman at each stage in the operation. This indicating device is a convenient but not an essential adjunct.

The pinion 26 and toothed disk 27 are journaled upon a sleeve 30, which is seated in a suitable boss 31, projecting inwardly from the rear wall of the casing. This sleeve 30 also constitutes the rear bearing for a shaft 32, on which is rigidly mounted the drum 33 of the controlling-switch. The front end of shaft 32 is squared and has fitted to it a pinion 34, having a hub 34$^a$, which projects through the front end of the casing and has a bearing therein. The shaft 32 projects beyond the casing a sufficient distance to receive the operating-handle 35.

In order to limit the movement of the toothed disk 27 to a degree corresponding to the stroke of the pawl 9, I mount a cup-shaped pin 36 in a recess 37 in the boss 31 and interpose between said pin and the bottom of the recess a coiled spring 38, so that sufficient frictional engagement between the head of the pin and the adjacent face of the disk is insured.

The drum 33 is divided into three sections 33$^a$, 33$^b$, and 33$^c$, separated from each other and from the adjacent annular flange 39 and a washer 39$^a$ by suitable insulating-rings 40. Each section of the drum is provided with radially-projecting arms 41, those in the same plane being connected by contact-plates of such length and position as to coöperate with corresponding fingers 42 and 43, located at the respective sides of the drum. The fingers 42 and 43 are so connected in circuit and the length and position of the coöperating contact-plates are such as to provide the circuit connections and variations desired in order to effect a reversal of the motor-circuits, and consequently a reversal in the direction of the motion of the vehicles operated thereby when the controlling switch-handle is moved from one side of the off position to the other. The fingers and contact-plates are also so arranged and connected as to provide other circuit-changes, which will be hereinafter more full described.

The outer surface of the front side of the switch-casing is provided with a plate 44 in the form of a ring-segment concentrically arranged with reference to the shaft 32 and having at its ends stop-lugs 45 and at substantially its middle point a stop-lug 46.

Pivoted between lugs or ears 47 on the inner side of the operating arm or handle 35 is a stop-lever 48, the outer end of which is pivoted to one end of a pin 49, that projects through the knob 50 on the end of the handle 35, and is normally pressed outward by means of a coiled spring 51, situated in a recess in the knob. (See Fig. 3.) The arm 35 is provided with a slot 52 in such position that when the pin 49 is pressed inward the inner end of the stop-lever may move outward into the slot, and thus release the arm from the stop-lug 46. The switch-drum and its operating-handle are in the off position when the stop-lever is in engagement with the lug 46. On each side of this stop-lug 46 there are three operating positions, the positions on one side being for one direction of movement of the car or train and those on the other side for the other direction of movement. The construction and relation of the drum-contacts and the coöperating fingers whereby the motors are reversed and other circuit changes effected will be more fully hereinafter described.

In order to insure the return of the handle 32 and the drum 33 to the off position automatically when released by the motorman, I provide a cylinder 53, which extends laterally between the side walls of the casing 1. In this cylinder is located a rack-bar 54, which is so arranged as to mesh with the pinion 34, which is carried by the outer squared end of the shaft 32. In each end of the cylinder 53 is mounted a coiled spring 56, having a longitudinally-movable casing 57 for its inner end, the inner end of each casing being in engagement with one end of the rack-bar 54. It will be seen that one or the other of these springs will be compressed whenever the shaft 32 is rotated, depending upon the direction of such rotation, and that when the shaft is released by the motorman the compressed spring will act upon the rack-bar, which in turn will rotate the pinion 34, and consequently the drum, to the off position.

The contact-fingers 42 and 43 are mounted upon a transverse plate 58, of insulating material, which is supported upon suitable lugs 59, projecting inwardly from the sides of the casing 1. The plate 58 is also provided with two adjacent terminals 60 of an electric circuit, a circuit-closing plug 61, of push-button form, being mounted in the front wall of the casing so as to engage these contact members 60 when pressed inward, this switch being provided for electropneumatically controlling the supply of sand from the sand-box.

Mounted in the front side of the casing is a shaft 62, carrying a contact arm or blade 63, which is arranged to engage with two or more of the contact-pieces 64, 65, and 66, mounted in plate 58. When the contact-blade 63 is in engagement with all of the contact-pieces 64, 65, and 66, all of the motor-cars are operatively included in the system. If the blade be moved so as to make engagement with contact-pieces 64 and 65 only, one of the motor-cars or one set of motor-cars is disengaged from the controlling system. On the other hand, if the contact-blade be moved in the other direction, so as to engage with contact-pieces 65 and 66 only, another motor-car or set of motor-cars is disengaged from the controlling system. In case there are more than two motor-cars in the train the arrangement of circuits with reference to the contact-pieces 64, 65, and 66 may be such that any specific motor-car or number of such cars may be included in or excluded from the controlling system by suitable manipulation of this switch.

Referring now to Figs. 7 and 8 in connection with the structural details shown in the preceding figures, the controller pawl-and-ratchet mechanism 68, operating and releasing cylinders 69 and 70, reversing-cylinder 71, circuit-breaker 72, electromagnets 69$^a$, 70$^a$, 71$^a$, and 72$^a$, pipe connections, and valves operated by such magnets may be substantially the same in construction and arrangement as the corresponding parts set forth in the Westinghouse patent hereinbefore referred to, except that the arrangement and use of the valves and magnets for the releasing-cylinders of the controller and circuit-breaker are such that the releasing mechanism becomes operative when the circuits of the electromagnets are inoperative either by reason of the interruption of such circuits or by reason of the failure of the battery or batteries, as will be hereinafter more fully described. The train-pipe 73, engineer's valves 74, pumps 75, main reservoirs 76, auxiliary reservoirs 77, brake-cylinders 78, supplemental reservoirs 79, and the piping between such apparatus, the operating and releasing cylinders 69 and 70, the reversing-switch cylinders 71 of the controller, the cylinders of the circuit-breaker 72, and the other coöperating parts not specifically illustrated are or may be substantially the same in construction and arrangement as the corresponding parts in the Westinghouse patent before referred to. The cylinder 5 of each controlling-switch is connected to the corresponding cylinder of the other controlling-switch of the same car, if there be one at each end of the car, by a pipe 80, as indicated in Fig. 7, and this pipe 80 is connected to the operating-cylinder by means of a branch pipe 81. In the same manner the cylinders 6 of the controlling-switches on each car are connected by a pipe 82, and this pipe is connected to the releasing-cylinder 70 by a branch pipe 83. The pipes 81 and 83 are respectively connected to the operating and releasing cylinders of the controllers in front of the normal positions of the pistons and at such points that they will receive air only when the respective pistons have completed their strokes.

In order that the current to the motors may never exceed a certain predetermined amount, I propose to locate in the branch pipe 81 a valve 84, such as is shown in Fig. 9. The partition-wall or diaphragm 85 in the valve-casing is provided with a valve-opening 86, a similar opening 87 being provided at the upper side of the double-ended valve 88. The extension 89 above the opening 87 is provided with one or more exhaust-openings 90, leading to the atmosphere. The double-headed valve 88 is of such dimensions that when its upper end is seated in the upper opening 87 the lower opening 86 will be uncovered, and vice versa. The lower end of the stem 91 of this valve is connected to a cup-shaped block 92, within which is located a coiled spring 93, which tends to hold the valve in its upper seat, and thus insures a free passage for the air from the operating-cylinder to the cylinder 5 of the controlling-switch, the connection from the operating-cylinder being at 84ª and that from the the cylinder 5 of the controlling-switch being at 84ᵇ. Mounted on the top of the valve-casing is an electromagnet 94, the coil of which is connected in shunt to the field-magnet windings 95 of one of the motors, as is indicated in Fig. 14. The winding of this magnet might be connected in shunt to a special resistance inserted in the circuit with one motor or by passing a few turns in the circuit from one motor around the core. The method indicated is, however, regarded as preferable, since it permits of the use of standard magnets and does not require any extra resistance. In order to reduce the insulation strains of the magnet-windings, this connection should be made at the grounded side of the circuit. The magnet and its armature may be of the construction illustrated in the Westinghouse patent, the armature being connected to the upper end of the valve by means of the valve rod or stem 91, so that when the current to the motors becomes excessive the magnet will draw down its armature and the valve will be seated in the opening 86 of the partition 85, all connection between the operating-cylinder and the controlling-switch cylinder being thus cut off. At the same time the upper opening 87 will be uncovered, so that cylinder 5 may exhaust into the atmosphere. This will prevent further movement of the controller-drum until the current is reduced to such a degree that the force of the spring 93 overcomes the pull of the magnet. In order to preclude any "on" movement of the controller-drum when pressure is applied to the piston of the releasing-cylinder and to insure the return of the operating-pawls to their initial positions, I provide a means for either interrupting the electrical circuit of the magnet of the operating-cylinder or a means for directly cutting off air from such cylinder and exhausting any pressure that may be contained therein. The first form of device is illustrated in Figs. 10 and 12, in which the casting 96, constituting the heads for the operating and releasing cylinders at one end, is provided with valves and with suitable passages leading from the valve-chambers to the respective cylinders. The head of the releasing-cylinder is provided with a valve-chamber 96ª, (see Fig. 11,) in which is located a valve 97, and with a passage 98, leading from one end of chamber 96ª to the magnet-valve chamber, with a passage 99 leading from the opposite end of the valve-chamber 96ª to the brake-cylinder and with an intermediate passage 100 leading directly to the releasing-cylinder. It will be seen that if air is admitted to passage 98 from the source by reason of the actuation of the magnet-valve the valve 97 will be thrown to the other end of the chamber 96ª from that in which it is shown in Fig. 11, and thus close the communication with the brake-cylinder and open that with the releasing-cylinder. If, on the other hand, the brakes are thrown on, the air from the brake-cylinder will throw the valve into the position shown in Fig. 11 and communicate directly with the releasing-cylinder. The features shown in Fig. 11 do not differ materially either in structure or function from the corresponding portion of the apparatus of the Westinghouse patent hereinbefore mentioned. The head of the releasing-cylinder is also provided with a supplemental cylinder 101, in which is mounted a piston 102, that is normally forced to its innermost position by means of a coiled spring 103, which surrounds its stem 104. The outer end of the stem is provided with a circuit-closing piece 105, suitably insulated from the rest of the stem. This circuit-closing piece 105 is arranged to make contact with two spring-terminals 106 when brought into the position shown in Fig. 12. These spring-terminals are connected in the main battery-circuit leading to the magnet of the operating-cylinder of the controller, and since the supplemental cylinder 101 is in open communication with the releasing-cylinder as soon as air is admitted to the releasing-cylinder the piston 102 will be forced outward against the action of the spring 104, and consequently the circuit-closing piece 105 will be moved away from the spring-terminals 106, and the circuit of the operating-cylinder magnet be thus opened. There is no possibility, therefore, of any positive movement of the controller-drum so long as sufficient pressure remains in the releasing-cylinder to overcome the action of the spring 103, and, furthermore, the operating-piston is necessarily returned to and held in its initial position. As soon as the pressure is withdrawn from the releasing-cylinder, however, the spring will force the piston inward, bringing the circuit-closing piece into position to bridge the space between the spring-terminals.

Instead of employing a device like that just described for interrupting the circuit for the operating-cylinder magnet I may employ the device shown in Fig. 13, in which a suitable casting 107, which may be mounted upon the controller-head in any suitable position or constitute a part of it, is provided with a cylinder 108, in which is mounted a piston 109, the outer end of the cylinder communicating, by means of a passage 110, with the releasing-cylinder and the other end communicating with the atmosphere by an exhaust-port 111. The valve-chamber of the operating-cylinder magnet communicates with chamber 112 by means of a port or passage 113, and the chamber 112 communicates with the operating-cylinder by means of valve-opening 115, valve-chamber 116, and port or passage 117. The opening 115 is normally uncovered, the valve 118 being mounted upon a stem 119, one end of which is either connected to or rests against the piston 109 and the other end of which is pressed in the direction of the piston by means of a coiled spring 120. When air-pressure is admitted to the releasing-cylinder, it passes through the passage 110 into the cylinder 108 in front of the piston 109, and forces the same rearwardly sufficiently to seat the end of the valve 118, and thus close the opening 115, and at the same time unseat the other end of the valve and so provide an exhaust-passage from the operating-cylinder through the passage 117, chamber 116, passage 121, cylinder 108, and exhaust-port 111.

The valves and valve-actuating magnets for the controller operating and releasing cylinders and the circuit-breaker are not here specifically illustrated and described, for the reason that the magnets and valves for the operating-cylinders are fully set forth, as regards both structure and operation, in the Westinghouse patent, and the valves and magnets for the circuit-breaker and controller-releasing cylinders are in all essential particulars like the corresponding parts shown in Fig. 9. It will be observed that either of these means, suitably modified, if desired, to comply with any conditions found in actual manufacture or service, may be employed effectively for the purpose of preventing positive operation of the controller, and consequently the starting of the motors and the train, during the time that air-pressure is applied to the releasing-cylinder and piston. It will also be seen that by this arrangement it is impossible to obtain sufficient air-pressure in the releasing-cylinder to return the controller-drum to its off position without at the same time exhausting the air from the operating-cylinder. It thus necessarily follows that the operating-pawls are retracted to the position where they will be disengaged from the ratchet-disks. It follows, therefore, that whenever the releasing-cylinder is supplied with air-pressure, either by the accidental interruption of the battery-circuit, the failure of the battery, or the application of the brakes, the operating-cylinder will be exhausted and the operating-pawls retracted, thus precluding any possibility of a locking action between the pawls and the disks and a consequent disturbance and disarrangement of the system.

The operation of the system may be briefly stated as follows: Assuming that there is sufficient air-pressure in the supplemental reservoir of each car to operate the controller or controllers of that car and that the battery $y$ of each car is in working condition, the operating-handle of the controlling-switch is moved to either position $a$ or position $-a$, according to the direction of movement desired, a sufficient pause being made at this point to insure the operation of the reversing-switch in case the direction of movement of the handle is different from that last made. Then movement is quickly made to position $c$ or position $-c$, as the case may be, the circuits being now such that the operating-cylinder magnet will be energized by current from the battery $y$, thus admitting air to the operating-cylinder, and consequently moving the controller-drum one step. If the reversing-switch is already set in the right position, the initial movement of the controlling-switch handle may be quickly made to either position $c$ or to position $-c$ without pausing at position $a$ or position $-a$. When the operating-piston completes its stroke, air passes through the branch pipe 81, pipe 80, and the opening 15 in the diaphragm 14 to the chamber 13, where it will act upon the piston 7 to force it, and consequently the pawl, upward. Since the spring 12 at the same time moves the pawl into engagement with the disk 27 the latter will be moved one step, and the indicator-plate and rack-bar 25 and piston 22 will also be moved one step. This movement of the parts will serve to break the circuit of the operating-cylinder magnet. The supply of air will be thus cut off from the operating-cylinder, and the supply of air already therein and also in the cylinder 5 of the controlling-switch will be exhausted in the manner set forth in the said Westinghouse patent. As soon as this action takes place the piston 7 will be depressed by means of the spring 16, and the contact from $19^a$ will again close the circuit of the operating-cylinder magnet, and the operation just described will be repeated automatically until the controller has been moved from the off to the complete on position. The speed at which this acceleration takes place may be predetermined by means of the diaphragm 14, the hole therethrough being made of such size as will insure the rate of acceleration desired. When it is desired to stop the car or train, the operating-handle may be returned to the off position by the motorman, or, if released, it will be returned to the off position automatically by one or the other of the springs 56. It will thus be seen that even though the motorman should become incapacitated from any cause the system will automatically provide for stopping the car or train. Whenever it is desired to operate the car or train at a uniform speed for any material length of time, whether the speed be a minimum, a maximum, or an intermediate one, the controller-handle is moved backward to position $b$, the circuit of the operating-cylinder magnet being thus opened and the rotation of the controller-drum being therefore discontinued.

Referring particularly to Fig. 8, I have indicated two controlling-switches A and B, one of which is shown at the right end and the other at the left end of the figure. The drum of each switch is shown as developed into a plane and as provided with contact strips or plates $h, i, k, l$, and $m$ on one side for engagement with one set 43 of contact-fingers, severally designated as $g, g', g^2, g^3$, and $g^4$, and provided at the other side with plates $n, p, q, r$, and $s$, arranged to coöperate with the other set 42 of fingers, severally designated as $f, f', f^2, f^3$, and $f^4$. Corresponding parts of both controlling-switches are the same in construction and arrangement and are designated by the same reference-letters. Each set of contact-fingers is shown as in position $x$ with reference to the corresponding drum, and in this position the circuit connections are as follows: Connection is made between fingers $f^4$ and $g^4$ by means of the plates $m$ and $s$ and the connection $d$ between them on the drum, which results in so connecting the operating-magnet $69^a$ with the circuit between the two controlling-switches on the car as to short-circuit the cut-out switch 63, 64, 65, and 66. The connections between fingers $g^4$ and $f^4$, referred to above, are for the purpose of rendering the cut-out switch 63, 64, 65, and 66 inoperative when the train is controlled by any other controlling-switch of the train, each controlling-switch when not in use for controlling the train being always in position $x$. It follows, therefore, that when any controlling-switch is left in position $x$ and the handle is removed it is not possible for an unauthorized person to disarrange the controlling system by any possible manipulations of any part of the controlling-switch. In position O battery-finger $g$ is in contact with plate $h$, and plates $h, r, n, p, q$, and $i$ are charged through the connections between these plates. In this position the finger $g'$ is also in contact with plate $h$, whereby the electrical circuit to the releasing-magnet $72^a$ of the circuit-breaker is closed and the air-pressure consequently exhausted from its cylinder and the breaker opens. In this position fingers $g^2$ and $g^3$ are also in contact with plate $k$, which results in closing one of the circuits through the cut-out switch and putting the same into operative condition. Position $a$ is the same as position O, except that finger $f$ is in contact with the plate $p$ and finger $f^3$ is in contact with plate $q$, the former connection closing the circuit to the magnet of the reversing-cylinder, which sets the reversing-switch on the controller in the direction for forward movement of the car, and the latter connection closes the circuit to the magnet of the releasing-cylinder, whereby the air-pressure from this cylinder is exhausted, leaving the controller in a condition for positive movement of the drum. Position $b$ is the same as position $a$, except that finger $f$ is disengaged from plate $p$, so that the action of setting the reversing-switch is stopped. Position $c$ is the same as position $b$, except that finger $f^2$ is in contact with plate $q$, whereby the circuit through the cut-out switch 63, 64, 65, and 66 and the automatic accelerating-switch $19^a$ 20 to the magnet of the operating-cylinder is closed, resulting in turning the controller on one or more steps. Positions $-a$, $-b$, and $-c$ are the same as positions $a$, $b$, and $c$, except that in position $-a$ finger $f'$ is in contact with plate $n$, which results in closing the circuit to that magnet of the reversing-cylinder which sets the reversing-switch of the controller for backward movement of the car. Assuming that the train is controlled by some other controlling-switch than those on the given car indicated in Fig. 8, the current for controlling said car is supplied through the circuit-wire $t$ to fingers $g^3 f^4 g^4$ of switch B and fingers $f^4$ and $g^4$ of switch A to the operating-magnet of the controller. If the train is controlled from controlling-switch A, switch B being left in position $x$, the current for controlling the car is supplied from the switch-drum through finger $f^2$, contacts 65 63 66, and finger $g^4$ of switch A to the magnet of the operating-cylinder of the controller and through finger $f^2$, contacts 65 63 64, fingers $g^2$ and $g^3$, and circuit-wire $t$ onto other cars of the train. With this arrangement it is evident that the operator may interrupt the circuit to contact 64 or to contact 66 by a manipulation of contact-arm 63, as described above. If the train is to be operated from controlling-switch B, switch A being in position $x$, the circuit is from the drum through finger $f^2$, contacts 65 63 66, and finger $g^4$ of switch B, and fingers $f^4$ and $g^4$ of switch A to the magnet of the operating-cylinder of the controller and through fingers $f^2$, contacts 65 63 64, fingers $g^2$ and $g^3$ of switch B, and circuit-wire $t$ to the other cars of the train.

The means for preventing an undue rush of current to the motors has already been described, and its operation will therefore be understood without further description. The means for automatically operating the circuit-breaker and operating the releasing-cylinder from the brake-cylinder when the brakes are applied are substantially the same as in the Westinghouse patent hereinbefore referred to and need not therefore be herein described in detail.

In Fig. 15 I have shown a modified means for effecting the application of air-pressure from the brake-cylinder to the releasing-cylinder of the controller or to that of the circuit-breaker, or both, when the brakes are applied. In this modification the air from the brake-cylinder passes by pipe 122 to a cylinder 123, in which it acts upon a piston 124 and moves the same against the action of a coiled spring 125. The stem 126 of piston 124 is provided with a conducting-piece 127, that normally bridges the space between contact-terminals 128 of the circuit of the releasing-magnet 129 when no force is opposed to the action of spring 125. It will be understood from the description of the operation of the releasing apparatus already given that when the circuit of magnet 129 is broken air will be admitted to the cylinder controlled by it, and the controller-drum or the circuit-breaker, as the case may be, will be actuated to open the motor-circuit.

In the modification shown in Fig. 16 the circuit of the releasing-magnet 129 is also provided with contact-terminals 128, with which coöperates a circuit making and breaking piece 127. In this case, however, the piece 127 is supported by a solenoid-core 130, the solenoid 131 being included in circuit with an electric-brake magnet 132, so that when the electric brakes are applied the current of magnet 129 will be broken.

In Fig. 17 a circuit breaker or controller 133 is normally held in position to maintain the power-circuit 134 closed by a magnet $129^a$, but is released so as to be moved to the off or inoperative position by any suitable means when the brake is applied, the circuit of the magnet $129^a$ and the means for making and breaking it being the same as the corresponding parts shown in Fig. 16. The same result might be effected by other means, and I therefore desire it to be understood that the means shown are intended to merely illustrate devices suitable for the purpose. It will also be understood that the means shown in any one of Figs. 15, 16, and 17 for interrupting the circuit of magnet 129 or the magnet $129^a$ may be so constructed and arranged as to break the circuit of the operating-cylinder magnet or the circuits of any number of the valve-actuating magnets of the system in order to render the power-circuit inactive as soon as the brakes are applied. In fact, the arrangement may be such as to effect any change of governing-circuits that will render the power-circuit inactive.

While I have illustrated and described specific details of construction, I desire it to be understood that my invention is not to be construed as limited to such details any further than the same may be specified in the claims.

I claim as my invention—

1. In a train of cars comprising a plurality of motor-cars, each of which is provided with a controller, the combination with fluid-pressure-actuated mechanism for operating such controller, electromagnetic means for governing and controlling the application of fluid-pressure to each of said operating mechanisms, a governing device comprising a manually-operated switch and an automatic switch, air and electric conductors, respectively connecting the fluid-pressure-actuated mechanism and the electromagnetic governing means of the controller with the governing device, whereby a step-by-step movement of the controller-drums in substantial synchronism is automatically effected when the manually-operated switch is closed.

2. In a train of cars comprising a plurality of motor-cars, each of which is provided with a controller, the combination with a fluid-pressure-actuated means for operating each controller, of electromagnetic means for governing and controlling the application of fluid-pressure to said operating mechanism and a governing device located at a point remote from said controllers and provided with operating devices and connections for automatically effecting a step-by-step movement of the controller-drums when the circuit of the electromagnetic governing means for the controllers is closed.

3. In a controlling system for electric motors, the combination with a plurality of controllers for such motors, of fluid-pressure-actuated mechanism for operating said controllers step by step, electromagnetically-operated valve mechanism for governing the application of air to the operating mechanism of said controllers, and a governing device for making and breaking the circuits of the electromagnets of the system, said device embodying a means operated by air from the controller mechanism at the completion of each movement step of the controller-drums, to break the circuit of the electromagnets of the controller-operating cylinder.

4. In a controlling system for electric motors, the combination with a plurality of controllers for such motors, of fluid-pressure-actuated mechanisms for operating such controllers, electromagnetically-actuated valves for controlling the application of fluid-pressure to such mechanisms, and a governing device provided with a manually-operated switch, means for automatically effecting a step-by-step movement of the controllers and means for automatically returning the switch to open-circuit position when released by the motorman.

5. A controller for electric motors, in combination with fluid-pressure-actuated means for operating it step by step from the position corresponding to zero-speed to the position of maximum or some intermediate speed of the motor or motors, means actuated by fluid-pressure for effecting the return of the controller-drum to the "off" position, electromagnetic mechanism for controlling the application of fluid-pressure to the mechanism for both operations, and a governing device embodying a manually-operated switch for making and breaking the circuits of the electromagnets of the system, automatic means for insuring a step-by-step movement of the controllers and means for automatically effecting the return of the governing-switch to open-circuit position when released by the motorman.

6. In a controlling system for a train of electrically-propelled cars, the combination with a plurality of controllers, each having mechanism actuated by fluid-pressure for operating it, of a governing device comprising a manually-operated switch for insuring an initial movement of the controllers and a means for automatically insuring a step-by-step movement of the controllers of the system in synchronism so long as the switch is maintained in its closed-circuit position.

7. In a controlling system for a train of electrically-propelled cars, the combination with a plurality of controllers, of mechanism actuated by fluid-pressure for operating each controller, and a governing device comprising a switch movable manually to circuit-closing position and automatically effecting the application of fluid-pressure to the controllers, so that all will be operated synchronously step by step when the manually-operated switch is in circuit-closing position.

8. In a controlling system for a train of electrically-propelled cars, the combination with a plurality of controllers, of mechanism actuated by fluid-pressure for operating each controller, and a governing device comprising a switch movable manually to circuit-closing position and automatically to circuit-breaking position and embodying also means for automatically effecting the application of fluid-pressure to the controllers so that all will be operated synchronously step by step when the manually-operated switch is in circuit-closing position.

9. In a controlling system for railway-trains comprising one or more motor-cars, controllers therefor and fluid-pressure-actuated mechanism for operating each controller, electromagnets and valves for governing and controlling the admission of air to the controller-operating cylinders, in combination with a governing-switch having an indicator, electric circuits including the said magnets and said governing-switch, and air connections between the controller-operating cylinders and the governing-switch whereby the indicator is automatically moved one step as each movement step of the controllers is completed.

10. In a controlling system for a train of electrically-propelled cars, the combination of a plurality of controllers and mechanism actuated by fluid-pressure for operating each controller, of electromagnets for directing and applying the fluid-pressure, a governing device having a circuit-closing member manually operated in one direction and automatically in the other, means operated by air from the fluid-pressure cylinders of the controllers when they have completed one step for breaking the circuit of the operating-cylinder electromagnet.

11. In an electropneumatic controlling system for electric motors, the combination with one or more controllers, of fluid-pressure-actuated mechanism for operating the same, a governing device having both electric and pneumatic connections with the controller-operating mechanisms, a normally open valve interposed in the pneumatic connection between the controllers and the governing device and an electromagnet connected to the motor-circuit, and serving, when the current to the motors exceeds a predetermined limit, to actuate the said valve so as to cut off air communication between the controller-operating cylinders and the governing device and exhausting the operating-cylinder of such device into the atmosphere.

12. In a controlling system for railway-motors, the combination with a controller and fluid-pressure-actuated means for operating such controller, of an electromagnetically-actuated valve for governing and directing the application of the fluid-pressure, a governing device provided with an air-cylinder and piston for breaking the circuit, a connection between the governing-device cylinder and the controller-operating cylinder, a normally open valve in said connection, and an electromagnet connected in shunt to the field-magnet windings of one of the motors of the system and serving to close said valve when the current to the motors exceeds a predetermined limit.

13. In a controlling system for railway-motors, the combination with one or more controllers and fluid-pressure-actuated means for operating such controllers, of electromagnetically-actuated valves for governing and directing the application of fluid-pressure, a governing device provided with an air-cylinder and piston for breaking the circuit of the operating-cylinder magnets, a connection between the governing-device cylinder and the controller-operating cylinder, a normally open valve in said connection, and an electromagnet connected in shunt to the field-magnet windings of one of the motors at the grounded side of the circuit and serving to close the valve so as to cut off air communication between the controller-operating cylinder and the governing-device cylinder when the current to the motors exceeds a predetermined limit.

14. In a controller for electric motors, the combination with operating mechanism actuated by fluid-pressure to effect a step-by-step movement of the controller-drum in one direction, valves for controlling and directing the application of fluid-pressure to said mechanism, electromagnets acting, when energized, to so move the valves as to apply fluid-pressure to the operating mechanism, means actuated by fluid-pressure to return the controller-drum to its zero or "off" position, valves for controlling and directing the application of such fluid-pressure, electromagnets acting upon said valves, when energized, to exhaust the fluid-pressure and, when de-energized, permitting the fluid-pressure to effect the return of the drum to its "off" position.

15. In a controlling system for electric motors embodying one or more controllers, the combination with fluid-pressure-actuated mechanism for moving each controller step by step, and fluid-pressure-actuated mechanism for returning the controller-drum to "off" position, of valves and controlling-magnets for directing and applying fluid-pressure to said actuated mechanisms, and means operated by the fluid-pressure that is applied to the controller for returning it to "off" position, to render the step-by-step mechanism inoperative.

16. In an electropneumatic controlling system for electric motors, the combination with a controller, of fluid-pressure-actuated mechanism for moving the controller step by step in one direction, electromagnetically-actuated valves for controlling the application of fluid-pressure to such mechanism, fluid-pressure-actuated mechanism for returning the controller-drum to "off" position, valves and controlling-magnets for governing the application of fluid-pressure to such mechanism, and a valve device actuated by the application of fluid-pressure to the mechanism for returning the drum to "off" position, to render the actuating mechanism for the step-by-step movement inoperative.

17. In an electropneumatic operating and controlling system for railway-vehicles, the combination with the power-circuit, of a brake system, electrically-governed means for making and breaking said circuit and means connected with the brake system whereby the application of the brakes serves to so affect the governing-circuit as to render the power-circuit inactive.

18. A synchronizing device for electropneumatic controlling systems comprising a circuit-closing device for each electromagnet or for each set of corresponding magnets in the system, and means for automatically breaking the controling-circuit at each movement step of the controllers.

19. In an electropneumatic controlling system for railway-vehicles, the combination with a controller and pneumatic means for operating it, of electromagnetically-actuated valve mechanism for governing said operating means and a governing device operated pneumatically from the controller and serving to break the circuit of the governing-magnet at each operation.

20. A governing and indicating device for electropneumatic systems of control comprising a casing having a sight-opening, an indicator-plate, a ratchet-disk and a pinion to which said plate is connected, a pneumatically-actuated rack and a pneumatically-actuated pawl for respectively engaging said pinion and said ratchet-disk and means for adjusting the rate of movement of said pawl.

21. A governing device for electropneumatic controlling systems comprising stationary contact-terminals, a circuit making and breaking piece, a piston and cylinder for operating said circuit making and breaking piece, the inlet end of the cylinder being provided with a removable diaphragm having an opening the size of which determines the rate of making and breaking the governing-circuit and consequently the rate of acceleration of the car or train under control.

22. An operating and controlling system for cars or trains of cars, embodying motors, controllers, and circuit-breakers, operating and releasing cylinders for the controllers and for the circuit-breakers, fluid-pressure connections and electromagnetically-actuated governing-valves for said cylinders, a governing device and connections arranged to supply pressure to the operating-cylinder and to exhaust the releasing-cylinders when the governing-magnets are energized and vice versa.

23. A governing device for electropneumatic controlling systems comprising contact-terminals in the governing-circuit, a coöperating contact member, a pneumatic means for actuating said member intermittingly to break the governing-circuit and means for adjusting the frequency of said governing-circuit breaks.

24. In an electropneumatic controlling system for electric motors, one or more controllers, a governing-circuit therefor, an intermittingly-operating make and break device for said circuit and means for adjusting the frequency of the make and break movements.

25. In an electropneumatic controlling system for electric motors, one or more controllers and means for applying pneumatic pressure to operate the same, in combination with an electric governing-circuit having a make and break device, means actuated by pneumatic pressure to move said device to circuit-breaking position and means for returning said device to circuit-making position when the pneumatic pressure is withdrawn.

In testimony whereof I have hereunto subscribed my name this 9th day of January, A. D. 1900.

ERNEST R. HILL.

Witnesses:
W. SUMNER SEITER,
WESLEY G. CARR.